Feb. 25, 1941.  F. C. THAMES  2,232,744
WHEEL TRUCK
Filed Nov. 21, 1939  3 Sheets-Sheet 1

Inventor
F. C. Thames
By Clarence A. O'Brien
and Hyman Berman
Attorneys

Feb. 25, 1941.                F. C. THAMES                 2,232,744
                               WHEEL TRUCK
                         Filed Nov. 21, 1939        3 Sheets-Sheet 2
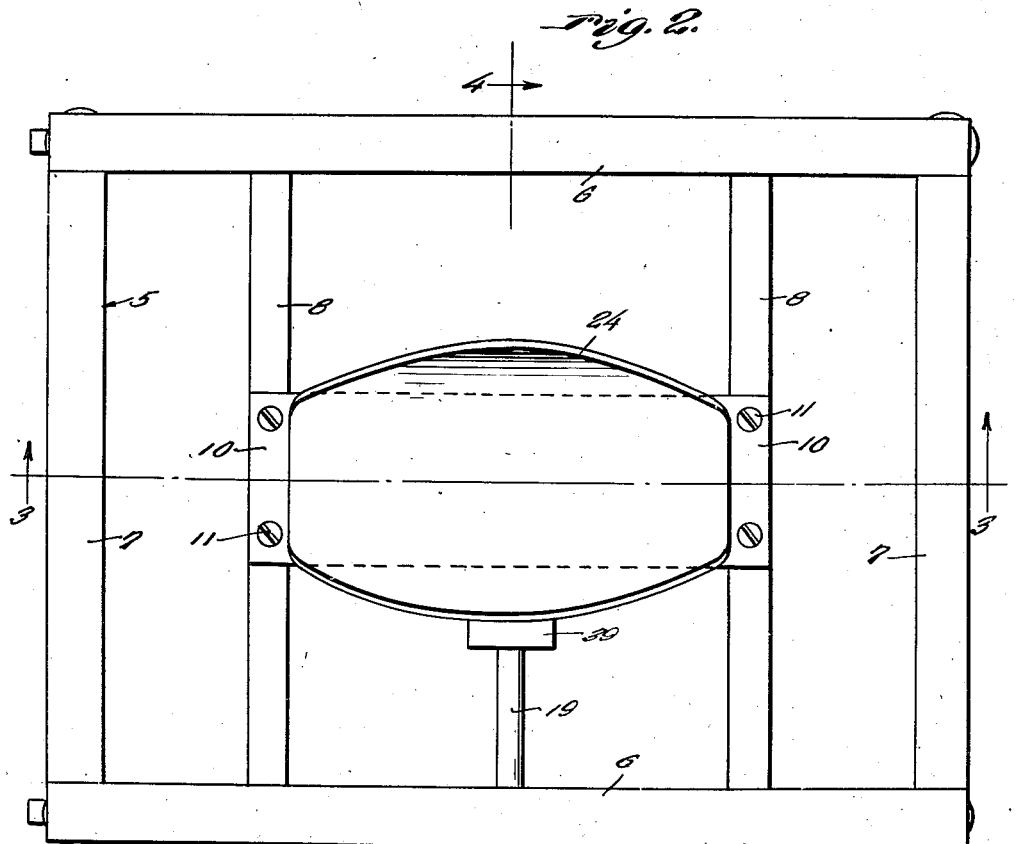
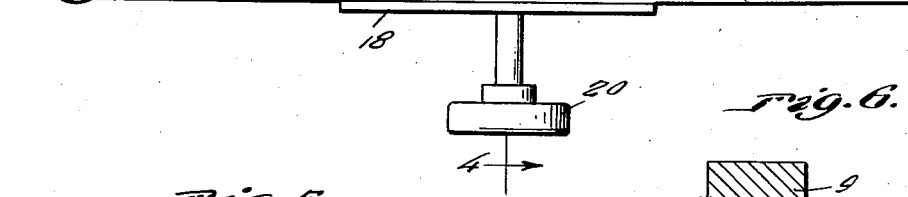
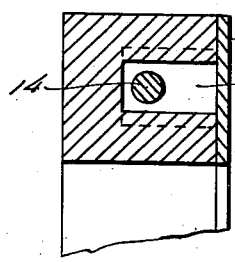
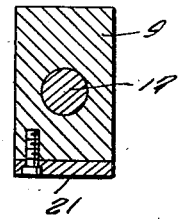
Inventor
F. C. Thames
By Clarence A. O'Brien
and Hyman Berman
Attorneys Inventor F. C. Thames By Clarence A. O'Brien
and Hyman Berman
Attorneys Patented Feb. 25, 1941

2,232,744

UNITED STATES PATENT OFFICE 2,232,744

WHEEL TRUCK

Frank C. Thames, San Antonio, Tex.

Application November 21, 1939, Serial No. 305,532

2 Claims. (Cl. 254—7)

This invention relates to new and useful improvements in means for facilitating the removal and replacement of heavy wheels on motor vehicles either of the land or aircraft type.

The principal object of the present invention is to provide a readily movable truck which can be conveniently placed under the desired wheel of a jacked vehicle for the purpose of engaging and conveniently removing the wheel to a desired location thus alleviating the workmen of the burden of handling the heavy wheel.

Other objects and advantages of the invention will become apparent to the reader of the following specification.

In the drawings:

Figure 2 is a top plan view of the truck with the hook assembly removed.

Figure 5 is a fragmentary detailed sectional view taken substantially on line 5—5 of Figure 3.

Figure 6 is a section on line 6—6 of Figure 3.

Figure 1:
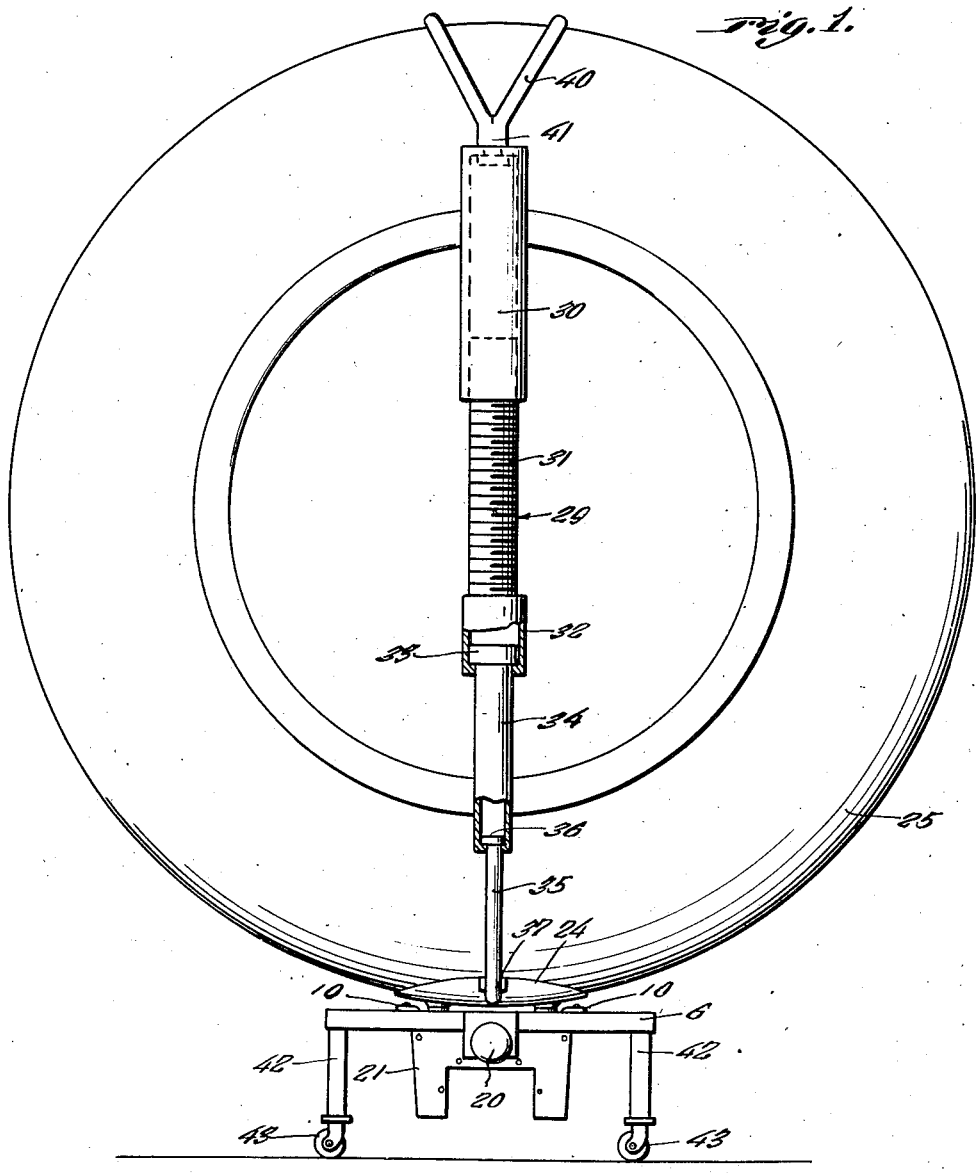
Figure 1 represents a side elevational view of the truck in use with a tire thereon.

Referring to the drawings wherein like numerals designate like parts, it can be seen that the truck consists of a frame 5 made up of the side angle bars 6—6 and end angle bars 7—7.

Bridging the side bars 6—6 are the bridge angle bars 8—8.

Figure 3:
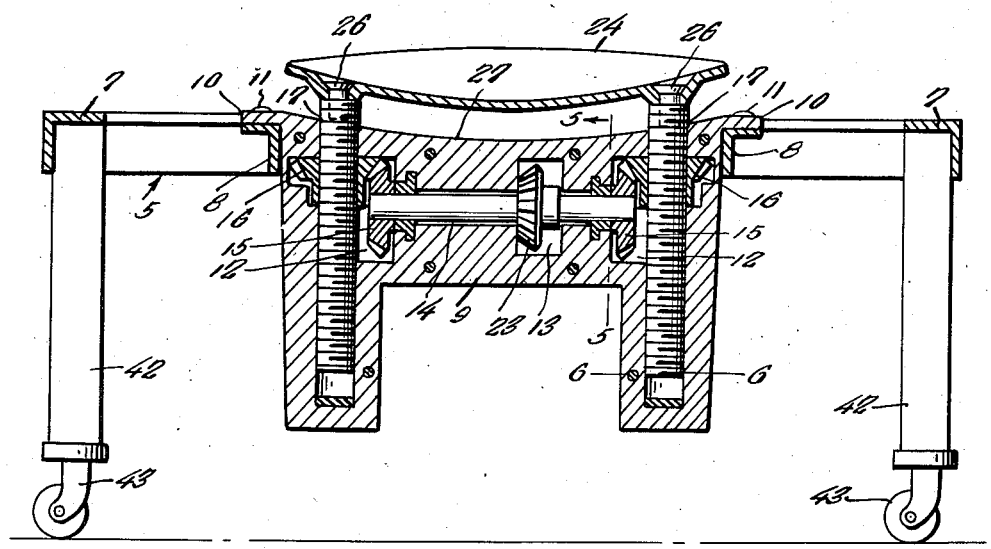
Figure 3 is a section on line 3—3 of Figure 2.

Numeral 9 denotes an elongated casting having lips or flanges 10 at the ends thereof adapted to be disposed over the bridge bars 8 to support the casting, as shown in Figure 3. Screws or the like 11 disposed outwardly through the lips 10 and into the angle bars 8 serve to secure the casting to the bridge bars 8.

Extending inwardly through one side of the casting 9 are the two end pockets 12—12 and the intermediate pocket 13. A shaft 14 extends horizontally through the casting 9 and has its ends terminating in the pockets 12—12 and on these ends of the shaft 14 and within the pockets 12 are the beveled pinions 15—15 meshing with beveled pinions 16—16 which have threaded bores and are threadedly disposed on the threaded vertical shaft 17.

One of the side bars 6 has an apron 18 depending therefrom and through this is disposed the rotatable shaft 19 having a hand knob 20 at its outer end.

The inner end of the shaft 19 is journally disposed through the plate 21 which is secured by suitable means to one side of the casting 9 for closing the pockets 12—12 and 13 therein. The inner end of this shaft 19 carries the beveled pinion 22 which meshes with the beveled pinion 23 carried on the intermediate portion of the shaft 14.

Numeral 24 denotes the saddle plate for supporting a tire 25. This plate 24 is arcuate in both longitudinal and transverse shape, the plate is elongated and has the rivet formation 26—26 securing the end portion thereof to the upper end of the screw shaft 17. The upper portion of the casting 9 is concaved, as at 27, so that the saddle plate 24 can nest therein.

Numeral 29 denotes the hook assembly for securing the tire 25 in place upon the saddle plate 24.

This hook assembly 29 consists of an internally threaded barrel 30, into one end of which is threadedly engaged one end of the threaded member 31. The other end of the threaded member 31 is provided with the hollow head 32 into which swivelly fits the head 33 of the hollow shank 34 and this hollow shank is flanged inwardly at its outer end and receives the hook shank 35 which has the head 36 thereof located therein.

The hook end 37 engages into the socket 38 on the under side of the boss 39 which projects laterally from the saddle plate 24.

A Y-shaped hook 40 has its shank 41 swivelly connected to the upper end of the internally threaded barrel 30 as suggested in Figure 1. Thus it can be seen that the Y-shaped hook 40 can be engaged over the upper portion of a tire 25 and the threaded member 31 suitably adjusted.

Figure 4:
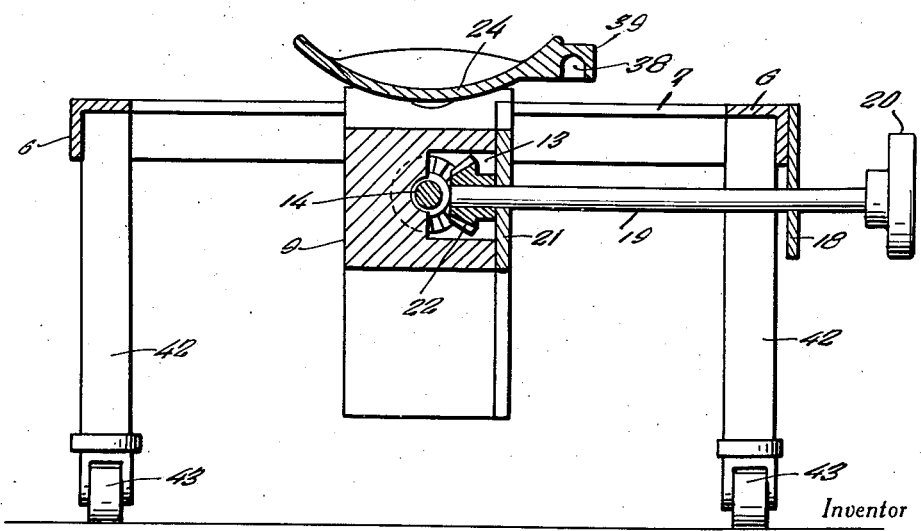
Figure 4 is a sectional view on line 4—4 of Figure 2.

It can be seen in Figures 1, 2 and 4, the corner portions of the frame 5 are provided with depending legs 42 which are provided with castor wheel assemblies 43 at the lower ends thereof.

In the use of the machine, it is first necessary to jack up the vehicle to lift the desired wheel off of the ground, after which the truck is slid under the wheel and the shaft 19 rotated until the saddle plate 24 is bearing against the tire. After this, the hook assembly 29 can be disposed in the position, as shown in Figure 1, and the wheel is now ready to be moved laterally from the vehicle while it is resting upon the truck. The truck can now be moved with its burden to the desired location.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a truck of the class described, a wheel-supported frame comprising a pair of cross-bars upon opposite sides of the center of the frame, respectively, a casting fixed to said bars to depend therefrom between the same and impart to the truck a low center of gravity, said casting being provided with a pair of closed pockets therein at opposite sides thereof and a similar pocket intermediate said pair, and said casting having a pair of vertical bores extending downwardly therein through the pockets of said pair and a horizontal bore extending between the pockets of said pair and said intermediate pocket, a pair of jacking shafts vertically slidable in said pair of bores, a cross-shaft extending through said horizontal bore, a pair of bevelled gears in each pocket of said pair operatively connecting one end of the cross-shaft to one of the jacking shafts, a crank-shaft extending into said casting to the intermediate pocket and geared to the cross-shaft within said pocket, and a concave saddle plate mounted on the upper ends of said jacking shafts for seating an automobile tire therein.

2. In a truck of the class described, a wheel-supported frame comprising a pair of cross-bars upon opposite sides of the center of the frame, respectively, a casting fixed to said bars to depend therefrom between the same and impart to the truck a low center of gravity, said casting being provided with a pair of closed pockets therein at opposite sides thereof and a similar pocket intermediate said pair, and said casting having a pair of vertical bores extending downwardly therein through the pockets of said pair and a horizontal bore extending between the pockets of said pair and said intermediate pocket, a pair of jacking shafts vertically slidable in said pair of bores, a cross-shaft extending through said horizontal bore, a pair of bevelled gears in each pocket of said pair operatively connecting one end of the cross-shaft to one of the jacking shafts, a crank-shaft extending into said casting to the intermediate pocket and geared to the cross-shaft within said pocket, a concave saddle plate mounted on the upper ends of said jacking shafts for seating an automobile tire therein, and a hook unit for straddling the tire and detachably connected to one edge of said plate.

FRANK C. THAMES.